Nov. 22, 1966     E. BALTACIS     3,287,081
APPARATUS FOR DETERMINING SHORT PHYSICAL PHENOMENA
AND ARRANGEMENT FOR CARRYING OUT THE METHOD
Filed Feb. 27, 1964     2 Sheets-Sheet 1

Nov. 22, 1966  E. BALTACIS  3,287,081
APPARATUS FOR DETERMINING SHORT PHYSICAL PHENOMENA
AND ARRANGEMENT FOR CARRYING OUT THE METHOD
Filed Feb. 27, 1964  2 Sheets-Sheet 2
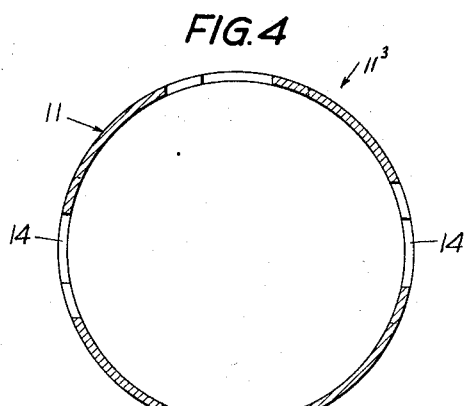
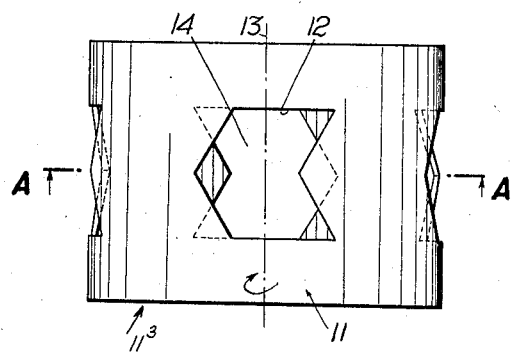
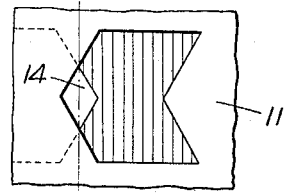
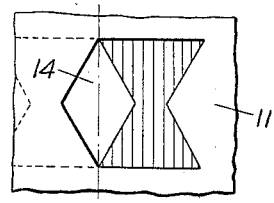
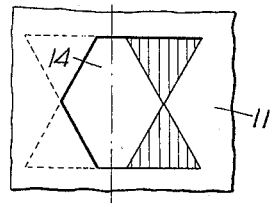
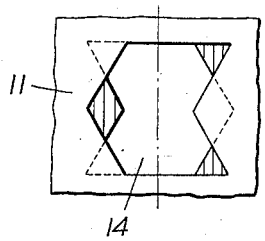
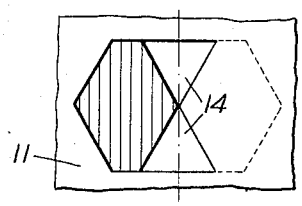
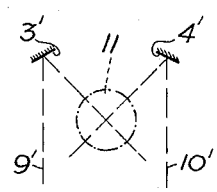

United States Patent Office 3,287,081
Patented Nov. 22, 1966

3,287,081
APPARATUS FOR DETERMINING SHORT PHYSICAL PHENOMENA AND ARRANGEMENT FOR CARRYING OUT THE METHOD
Eriks Baltacis, Vienna, Austria, assignor to Osterreichische Studiengesellschaft für Atomenergie Ges.m.b.H., Vienna, Austria
Filed Feb. 27, 1964, Ser. No. 347,917
Claims priority, application Austria, Mar. 5, 1963,
A 1,733/63
2 Claims. (Cl. 352—84)

The present invention relates to an apparatus for determining short physical phenomena.

It is one object of the present invention to provide an apparatus for determining short physical phenomena and arrangement for carrying out the method, wherein rays representing the physical phenomenon are divided into beams, the latter being guided and having an angle to each other through a rotating shutter in form of a drum and are controlled there with an intensity, whereby the changes of intensity are always effected from the horizontal central plane of the shutter openings. Then the beams are guided to a revolving mirror after one or more deflections, which mirror projects the beams to an intercepting device. The arrangement for carrying out the method comprises according to the present invention a system of lenses, fixed and revolving systems of mirrors, a rotating shutter and a movable intercepting device whereby the shutter is formed by a rotating drum the walls of which have $2n$ dovetailed apertures.

Rotating shutters are already known in various types and are utilized for a plurality of purposes. The shutters of known construction are based in principle on pierced or slotted circular disks which rotate in opposite directions or pass a diaphragm.

With this and other objects in view which will become apparent from the following detailed description, the present invention will be clearly understood in connection with the accompanying drawings, in which:

FIGURE 1 is a schematic perspective view of an arrangement for carrying out the present invention;

FIG. 2 discloses another embodiment having a horizontal drum;

FIG. 4 is the special section of a shutter along the lines A—A of FIG. 5;

FIG. 5 is an elevation of the shutter, shown in FIG. 4;

Figure 2:
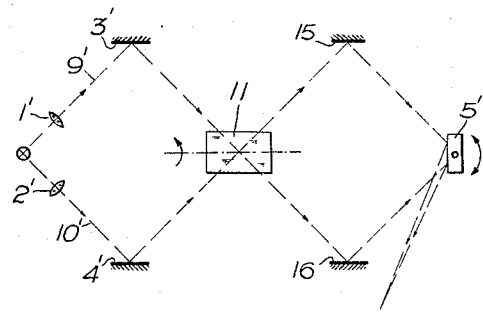

FIGS. 6 to 10 disclose successive shapes of the opening for the passage of the beams; and FIG. 11 is a modified detail according to FIG. 2.

Figure 1:
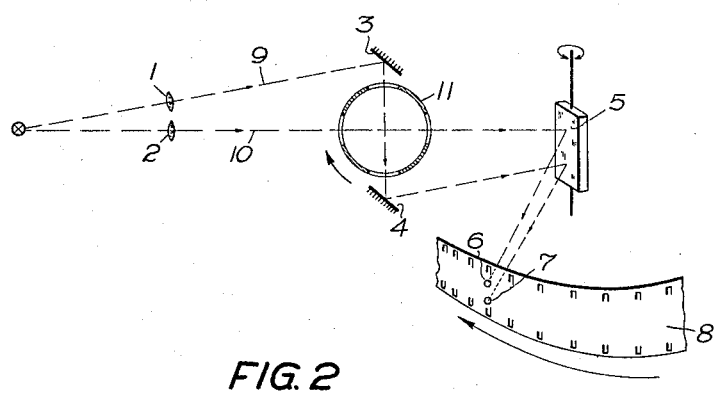

Referring now to the drawings, and in particular to FIG. 1, the construction of a stereoscopic ultra-high-speed camera is disclosed. The rays representing the physical phenomenon are propagated from a source. According to the present example two of these rays are passing a system of lenses 1 and 2, i.e. the beam 9 passes the lens 1 and the beam 10 passes the lens 2. The beam 10 reaches directly the shutter 11 and after passing the apertures of the shutter the beam hits a revolving mirror 5. This mirror might also be replaced by a revolving polyhedral mirror prism. The beam 9 is deflected by the mirror 3 and passes likewise the apertures of the shutter 11. In the shutter 11, the beam 9 intersects the beam 10. Leaving the shutter 11 the beam 9 impinges also upon the mirror 5. By means of the revolving mirror 5, both beams 9 and 10 are projected onto a moving film. If the rotation of the mirror 5 is effected in the direction of the motion of the film 8, the image is drawn along with the film 8 during the exposure, so that relative movement occurs between the film 8 and the image during the exposure. The images 6 and 7 of the beams 9 and 10 are thus projected locally superposing onto the film, by interpretating these images exactly which are determined space-time-points of the photographed phenomenon extremely fast, are thus gained.

If a temporary extension of the fast phenomenon to be photographed is demanded, regardless of the separation of the images, the rotation of the mirror prism 5 has to be effected contrary to the direction of motion of the film 8. This being the case the image is "smeared" over the film.

The inventive arrangement is suitable for the visualization of many physical processes being temporary especially for comprehensing extremely fast phenomena for instance in plasma physics. The time difference between the two images 6 and 7 is less than $10^{-11}$ sec. It is self evident, that the method of the present invention has to be effected in a high vacuum.

Referring now again to the drawings, and in particular to FIG. 2, an arrangement is shown where the axis of rotation of a drum 11 is disposed in the direction of the axis of the arrangement. The beam 9' hits a mirror 3' which is suitably formed as a concave mirror, passes transversely the drum 11. It hits a further mirror 16, thence it is reflected to a revolving mirror 5'. The beam 10' reaches the mirror 5' by way of the mirrors 4 and 15. The beams 9' and 10' pass at first through the lenses 1' and 2'. By this arrangement the possibility is rendered, to increase the efficiency of the arrangement with respect to the arrangement as shown in FIG. 1. It is self evident that the beams 9' and 10' can also pass the drum vertically to the longitudinal axis of the arrangement. In this case the mirrors 3' and 4' as well as 15 and 16 have to be specially displaced relative to each other. This is shown schematically in FIG. 11.

Figure 3:
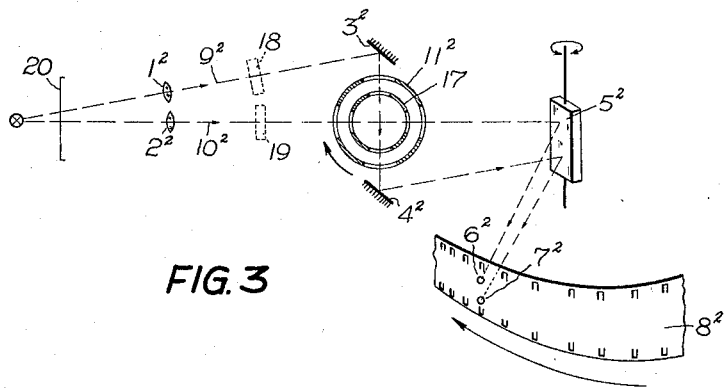
FIG. 3 is a third embodiment of the present invention.

Referring now to FIG. 3, another embodiment is disclosed, wherein a further drum 17 is concentrically arranged in a drum $11^2$, whereby the dark periods can be essentially extended. At the same time various equipments are provided which might also be used with the other embodiments, but which are not absolutely necessary, for instance, a shutter 20 is arranged as central shutter, as well as grid shutter or which might be replaced eventually by an image changer. Filters 18, 19 might also be placed into the path of the beams $9^2$ and $10^2$, which pass the lenses $1^2$ and $2^2$. The lenses $1^2$ and $2^2$ could be replaced by mirror optics.

Referring now to FIGS. 4 and 5, the shutter $11^3$ can be taken more clearly. The shutter $11^3$ consists of a drum, in the walls of which $2n$ dovetailed apertures 12 are provided. All these dovetailed openings 12 are directed in the same direction. The drum is preferably made of pure chromium and is rotated very quick about an axis 13. A light beam reaching the shutter has to pass two diametrically arranged apertures before reaching the revolving mirror 5. By rotation of the drum, the opening 14 for the light beam is changed continuously. The change of the opening 14 is effected by the relative motion of the two diametrically arranged apertures 12 with respect to the incoming beam. The geometry of the apertures allows a continuous exposure of the film from the center to the edge, and vice versa. By the construction of the shutter $11^3$ both the beams are locked and opened exactly at the same time. There might be reinforcements and ripplings at the walls for a better stability of the shutter drum.

Referring now to FIGS. 6 and 10, different openings are shown schematically for the beams to pass; however, the curvature of the drum has been neglected. The openings are all indicated by the reference numeral 14.

As already stated, this shutter drum renders the possibility to survey extremely fast phenomena.

While I have disclosed several embodiments of the present invention, it is to be understood that these embodiments are given by example only and not in a limiting sense, the scope of the present invention being determined by the objects and the claims.

I claim:
1. An apparatus for the determination of short-timed physical phenomena, comprising
   means for division of rays constituting the physical phenomenon, thereby providing separate light beams,
   rotatable reflecting means intersecting said separate light beams for deflecting the direction of said beams to an intercepting device for said beams,
   a rotatable drum shutter between said means for division of rays and said rotatable means in such position as to directly pass or occult one of said light beams,
   light redirecting means positioned on diametrically opposite sides of said shutter in the other light path, and
   said shutter having $2n$ dovetail-shaped apertures simultaneously passing or occulting both of said beams, whereby a change of the intensity is obtained symmetrically to the horizontal median plane of said apertures.

2. The apparatus, as set forth in claim 1, which includes
   a second shutter disposed concentrically with said first shutter,
   the number of apertures in said second shutter is the same as that of said first shutter,
   the shape of said dovetail-shaped apertures in said respective shutters is reversed with respect to each other, and
   said shutters are counter-rotatable.

References Cited by the Examiner
UNITED STATES PATENTS

| | | | |
|---|---|---|---|
| 2,098,370 | 6/1914 | Donnelly | 352—208 |
| 2,668,473 | 2/1954 | Brixner | 352—84 |

JULIA E. COINER, *Primary Examiner.*